S. WILMOT.
FISH-HATCHING APPARATUS.
No. 180,085. Patented July 18, 1876.
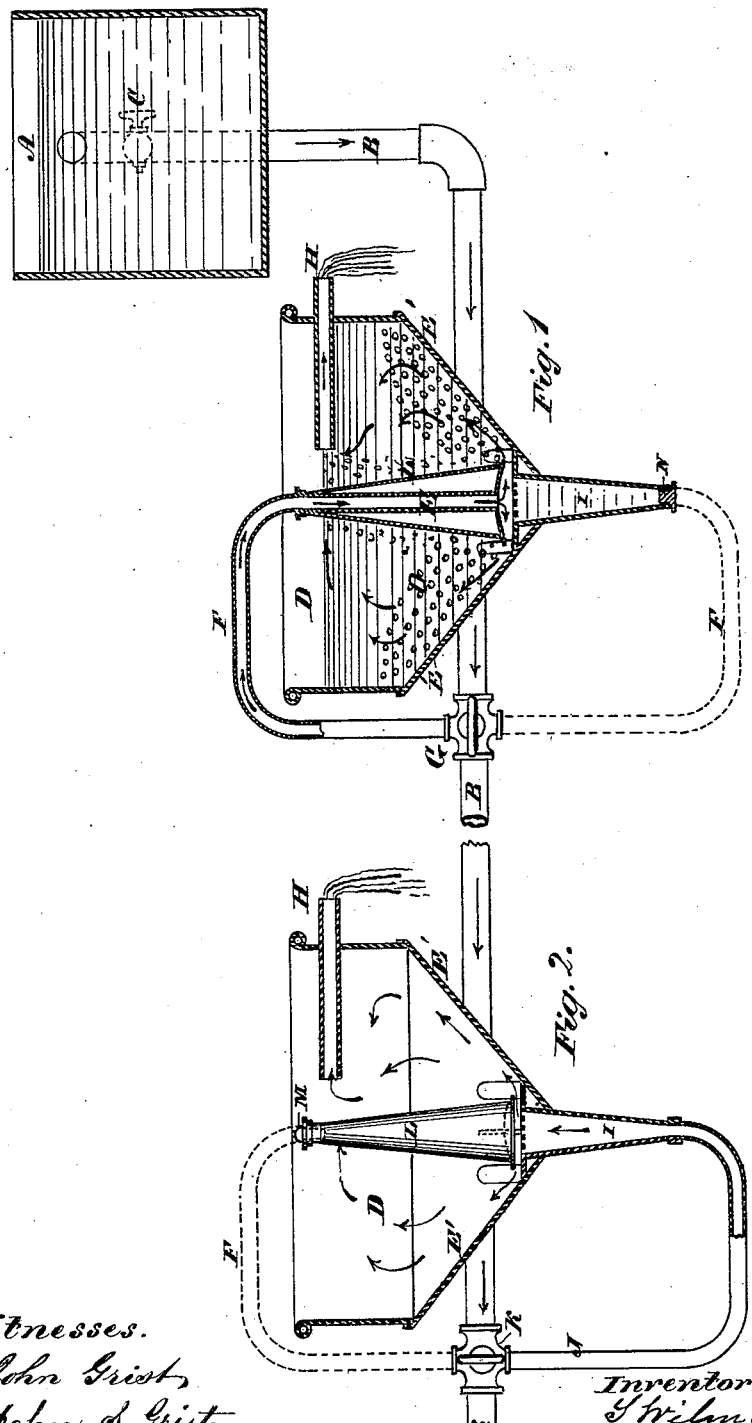
Witnesses.
John Grist
John. S. Grist
Inventor
S Wilmot
By Henry Grist
Attorney.

UNITED STATES PATENT OFFICE.

SAMUEL WILMOT, OF NEWCASTLE, ONTARIO, CANADA.

IMPROVEMENT IN FISH-HATCHING APPARATUS.

Specification forming part of Letters Patent No. 180,085, dated July 18, 1876; application filed May 15, 1876.

*To all whom it may concern:*

Be it known that I, SAMUEL WILMOT, of Newcastle, in the county of Durham, in the Province of Ontario and Dominion of Canada, have invented certain new and useful Improvements on Fish-Hatching Apparatus; and I do hereby declare that the following is a full, clear, and exact description of the same.

My improvement relates to those fish-hatching receptacles which are constructed in such a manner as to permit a flow of water to pass upwardly from the bottom of the same, for the purpose of keeping the eggs in motion. Heretofore these receptacles have been provided with a wire screen or rim, for the purpose of preventing the eggs in the receptacle from liability of removal with the overflow.

In my improvement I dispense with the wire rim and keep the perfect eggs within the receptacle by regulating the force of the flow of water so as not to lift them to the height of the overflow, only deleterious lighter substances being raised to a sufficient height to pass off with the overflow, the object of my invention being to cleanse the ova and separate the perfect from the imperfect eggs in the process of hatching, and to prevent sediment in the water from being deposited on the ova; and my invention consists, first, of a fish-hatching apparatus, having basins for incubation, in which a vertical circulating current of water keeps the eggs in motion, the defective ones passing off with the overflow waste; second, of a fish-hatching apparatus, having one or more funnel-shaped basins of a rounded bottom, and a central vertical tube or stand-pipe delivering the inflow either upward or downward at the bottom of the basin, and an eduction pipe or spout, through which the defective ova near the surface of the water are carried off with the overflow waste-water; third, of a fish-hatching apparatus, having one or more receptacles, provided with an induction-pipe, having an inclined jacket for digressing the inflow and a waste-outlet pipe.

Figure 1 is a central vertical section of my improved apparatus, showing an induction-flow downwardly into the incubating-basin. Fig. 2 is a like view, showing an induction-flow upwardly into the basin.

A is a reservoir of water, and B an eduction-pipe therefrom, provided with valve *c* for regulating the flow therefrom. D are the hatching-basins, funnel-shaped, or of other suitable shape, constructed with inwardly-tapering sides E', or having a rounding bottom. E is a vertical induction-tube, removably suspended or fixed in any suitable manner within the basin D, its outlet being near the bottom of the basin, its inlet connecting with the pipe B by means of a hose, F, or other contrivance provided with a valve, G, for regulating the supply of water. H is an overflow pipe or spout to carry off the imperfect or dead ova with the waste water.

In Fig. 2 is shown a modification of my apparatus, in which the water passes into the basin upwardly through a tube, I, having a perforated outlet in the bottom of the basin, said tube I connecting with the supply-pipe B by a hose, J, having a valve, K, for regulating the supply.

If found convenient to place the supply-pipe B below the basins D, they may be set upon thimbles projecting from the supply-pipe B, in which case the hose-connections F J may be dispensed with.

The tube E may be surrounded by a conical jacket, L, tapering upwardly to induce a graduated current upwardly, whereby the light or imperfect eggs are carried up with the current to near the surface of the water, the heavy or perfect eggs falling toward the bottom of the basin.

M N are stoppers in the tubes E I, to be used as occasion may require.

The operation of the apparatus is as follows: The water from the reservoir A, by a connection of pipes, passes through the tube E downwardly into the bottom of the basin, or upwardly through the tube I, in each case the water being discharged into the basin at or near its bottom. The water, striking against the bottom of the basin in the one case, and the bottom of the tube E in the other case, glances off uniformly around the slanting sides of the basin, carrying up with it the ova or eggs O, which, following the current, then roll toward the tube E. The heavy or sound eggs fall to the bottom of the basin at the sides of the jacket or tube, to be again moved by the circulation of water, as before mentioned.

The light or imperfect eggs, together with sedimentary substances in the water, pass up the outside of the jacket by the upward flow, and are carried off with the waste water through the pipe or spout H.

I claim as my invention—

1. In the art of fish-hatching, the process of cleansing ova and separating the imperfect from the sound and perfect eggs, consisting essentially in placing said ova in a suitably formed basin or other receptacle, causing an upward flow of water therein sufficiently strong to keep said ova slightly in motion, and removing sediment and the lighter or defective eggs by means of the overflow, substantially as described, and for the purpose set forth.

2. A fish-hatching apparatus, having one or more funnel-shaped or rounded bottom basins, D, a central induction-pipe, E, for discharging water downwardly therein, and an overflow-pipe, H, for carrying off the sediment and defective ova with the waste water, as set forth.

3. A fish-hatching apparatus, having one or more funnel-shaped or rounded-bottom basins, D, an induction-pipe, E, for discharging water downwardly into the same, an inclined jacket, L, for digressing the inflow, and a waste-outlet pipe, H, substantially as and for the purpose set forth.

SAML. WILMOT.

Witnesses:
A. WILMOT,
GEORGE CURTIS.